United States Patent
Breun et al.

(10) Patent No.: US 10,284,241 B2
(45) Date of Patent: May 7, 2019

(54) RECEIVERS AND METHODS FOR REDUCING AN INTERFERENCE COMPONENT IN A RECEIVE SIGNAL

(71) Applicant: Intel IP Corporation, Santa Clara, CA (US)

(72) Inventors: Peter Breun, Munich (DE); Joachim Wehinger, Unterhaching (DE)

(73) Assignee: Intel IP Corporation, Santa Clara, CA (US)

(*) Notice: Subject to any disclaimer, the term of this patent is extended or adjusted under 35 U.S.C. 154(b) by 2 days.

(21) Appl. No.: 15/794,028

(22) Filed: Oct. 26, 2017

(65) Prior Publication Data

US 2018/0175896 A1 Jun. 21, 2018

(30) Foreign Application Priority Data

Dec. 21, 2016 (EP) .................................. 16205821

(51) Int. Cl.
| | | |
|---|---|---|
| H03D 1/04 | (2006.01) |
| H04B 1/10 | (2006.01) |
| H04B 1/12 | (2006.01) |
| H04L 25/02 | (2006.01) |
| H04L 25/03 | (2006.01) |

(Continued)

(52) U.S. Cl.
CPC .......... H04B 1/1036 (2013.01); H04B 1/123 (2013.01); H04B 1/71072 (2013.01); H04J 11/004 (2013.01); H04L 25/0202 (2013.01); H04L 25/03006 (2013.01)

(58) Field of Classification Search
CPC ... H04B 1/1036; H04B 1/123; H04L 25/0202; H04L 25/03006

USPC ......................................................... 375/346
See application file for complete search history.

(56) References Cited

U.S. PATENT DOCUMENTS

| | | | | |
|---|---|---|---|---|
| 6,847,803 | B1* | 1/2005 | Rauhala ................. | H04B 1/126 370/252 |
| 8,270,394 | B1* | 9/2012 | Chen ........................ | H04B 3/32 370/201 |
| 9,900,789 | B2* | 2/2018 | Park ....................... | H04W 24/02 |

(Continued)

FOREIGN PATENT DOCUMENTS

GB 2384662 A 7/2003

*Primary Examiner* — Helene E Tayong
(74) *Attorney, Agent, or Firm* — 2SPL Patentanwälte PartG mbB; Mani Arabi

(57) ABSTRACT

A receiver for reducing an interference component in a receive signal is provided. The interference component is caused by a first interferer emitting payload data and a second interferer emitting only broadcast data for communication control. The receiver includes a first compensation circuit configured to generate a first compensation signal based on a component of the receive signal received from the first interferer. Further, the receiver includes a second compensation circuit configured to generate a second compensation signal based on only a-priori knowledge of at least one broadcast channel carrying the broadcast data, or based on a detection of symbols in the receive signal which represent the broadcast data. The detection of symbols is based on only the a-priori knowledge of the at least one broadcast channel. The receiver also includes a combination circuit configured to combine the receive signal, the first compensation signal and the second compensation signal.

22 Claims, 5 Drawing Sheets

100: receiver
101: receive signal
102: compensated receive signal
110: first compensation circuit
111: first compensation signal
120: second compensation circuit
121: second compensation signal
130: combination circuit
140: first interferer
150: second interferer

(51) Int. Cl.
*H04B 1/7107* (2011.01)
*H04J 11/00* (2006.01)

(56) References Cited

U.S. PATENT DOCUMENTS

| | | | |
|---|---|---|---|
| 2003/0016770 A1* | 1/2003 | Trans | H04B 1/00 375/346 |
| 2015/0003509 A1 | 1/2015 | Faber et al. | |
| 2015/0098533 A1* | 4/2015 | Rusek | H04B 1/1027 375/350 |
| 2015/0139004 A1 | 5/2015 | Fodor et al. | |

* cited by examiner

400: receiver
401: receive signal
402: compensated receive signal
410: estimation circuit
420: decision circuit
430: first compensation circuit
431: compensation signal
440: combination circuit
450: second compensation circuit
451: compensation signal
460: interferer

RECEIVERS AND METHODS FOR REDUCING AN INTERFERENCE COMPONENT IN A RECEIVE SIGNAL

FIELD

Examples relate to interference cancellation. In particular, examples relate to receivers and methods for reducing an interference component in a receive signal.

BACKGROUND

Interference from neighboring base stations is a serious problem for a user equipment in mobile communications. Also in wireless local area networks or in wireline networks, interference is a serious problem for receive devices. Interference cancellation comes at quite some cost in terms of die-size, firmware algorithm complexity, and power consumption.

Hence, there may be a desire for an improved interference cancellation technique.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
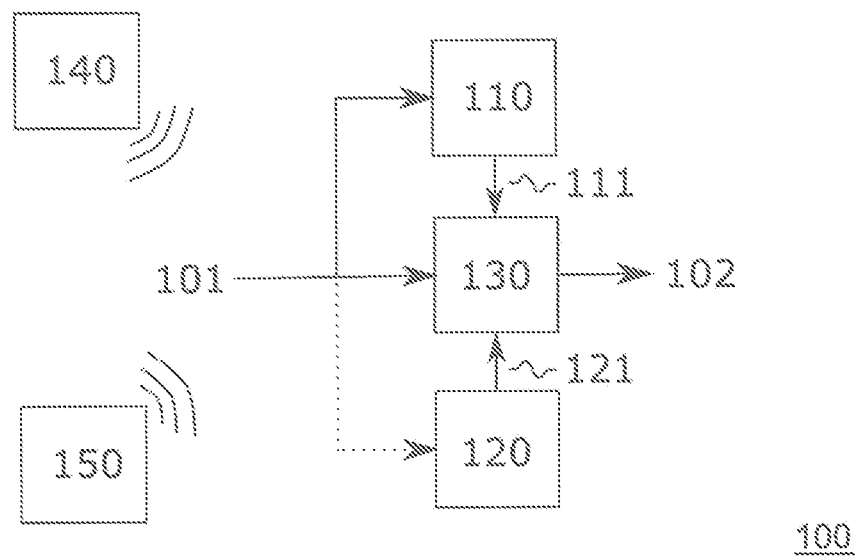
FIG. 1 illustrates an example of a receiver for reducing an interference component in a receive signal.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

In the following, various examples relate to devices (e.g. cell phone, base station) or components (e.g. transmitter, transceiver) of devices used in wireless or mobile communications systems. A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (EUTRAN), LTE or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In these examples, the mobile communication system may comprise mobile transceivers, relay station transceivers and base station transceivers. The relay station transceivers and base station transceivers can be composed of one or more central units and one or more remote units.

A mobile transceiver or mobile device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

FIG. 1 illustrates a receiver 100 for reducing an interference component in a receive signal 101. The interference component is caused by a first interferer 140 emitting payload data and a second interferer 150 emitting only broadcast data for communication control. The receiver 100 includes a first compensation circuit 110 configured to generate a first compensation signal 111 based on a component of the receive signal 101 which is received from the first interferer 140. Further, the receiver 100 includes a second compensation circuit 120 configured to generate a second compensation signal 121 based on only a-priori knowledge of at least one broadcast channel carrying the broadcast data, or based on a detection of symbols in the receive signal 101 which represent the broadcast data. The detection of symbols is based on only the a-priori knowledge of the at least one broadcast channel. The receiver 100 also includes a combination circuit 130 configured to combine the receive signal 101, the first compensation signal 111 and the second compensation signal 121.

The receiver 100 may allow to generate a compensated receive signal 102 with reduced or removed interference component. Additionally, interference caused by the second interferer may be reduced with reduced power consumption. Moreover, a die size of the receiver 100 may be reduced compared to conventional approaches due to reduced complexity of the second compensation circuit 120. The complexity and the power consumption of the second compensation circuit 120 may be reduced since only the a-priori knowledge of the at least one broadcast channel is used for generating the second compensation or the symbols. Hence, no complex algorithms or circuit structures for the detection of the broadcast data allocation and the modulation scheme detection are required.

Payload data designates any data for one or more users which is transmitted from the first interferer 140. In contrast thereto, the broadcast data for communication control designates any data broadcast by the second interferer 150 which comprises information for controlling any communication between the second interferer 150 and a further entity. For example, the broadcast data for communication control may be pilot or synchronization data for establishing or synchronizing a communication connection with the second interferer 150.

The receiver 100 may, e.g., be a receiver for wireless signals or wireline signals. Accordingly, the receive signal 101 may be received via air interface or via cable/fiber. As indicated above, the receive signal 101 may comprise a desired signal component which is received from a communication partner and undesired signal components which are received from interferers. In addition, the desired signal component may be disturbed by the signals of interferers, so that the desired signal component may comprise the interference component. The interference component may, e.g., reduce a Signal-to-Noise Ratio (SNR) of the receive signal 101, so that a data throughput of the receiver and any subsequent signal processing circuit may be reduced. It is therefore desirable to remove the interference component from the receive signal 101.

The communication partner as well as the interferers may, e.g., transmit signals corresponding to one of the mobile communication systems standardized by the 3GPPP or the IEEE. For example, the communication partner or the interferers may transmit signals corresponding to GSM, EDGE, HSPA, LTE, LTE-A, 5$^{th}$ Generation (5G), WLAN, etc. Accordingly, the receive signal 101 may comprise undesired components or interference components corresponding to different mobile communication systems.

The communication partner may, e.g., be a serving base station of a mobile communication systems, a WLAN router, or a communication node of a wireline system. The first interferer 140 and the second interferer 150 may, e.g., be neighboring base stations of the serving base station, a further (second) WLAN router, etc.

The first compensation circuit 110 generates the first compensation signal 111 based on the component of the receive signal 101 which is received from the first interferer 140. That is, the first compensation signal 111 may allow to reduce the interference component caused by the first interferer. Therefore, the first compensation circuit 110 may, e.g., identify the component of the receive signal 101 which is received from the first interferer 140, reconstruct the payload data carried by this signal component and generate the first compensation signal 111 based on the reconstructed payload data. In this respect, the first compensation circuit 110 may be configured to take into account mechanisms which cause the interference component in the receive signal 101.

In some examples, the first compensation circuit 110 may, thus, be further configured to determine, based on the receive signal 101, at least one downlink channel carrying the payload data. Further, the first compensation circuit 110 may be configured to generate, based on the receive signal 101, a demodulated data signal comprising the payload data of the downlink channel. The first compensation circuit 110 may then be configured to generate the first compensation signal 111 based on the demodulated data signal.

For example, for a High Speed Downlink Packet Access (HSDPA) receive signal 101, the first compensation circuit 110 may be configured to determine the at least one downlink channel by de-spreading the receive signal 101 using a spread code employed by the first interferer 140. The spread code employed by the first interferer 140 may, e.g., be detected by blind detection. For example, the first compensation circuit 110 may be configured to de-spread the receive signal 101 using a possible spread code (i.e. a candidate spread code), to calculate a code power of the possible spread code, and to select the possible spread code as the spread code employed by the first interferer 140 if the code power is above a threshold. Then, the first compensation circuit 110 may be further configured to generate the demodulated data signal by demodulating the de-spread receive signal. Also the modulation scheme of the receive signal 101 may be detected blindly. The first compensation circuit 110 may be further configured to generate the first compensation signal 111 by spreading the demodulated data signal using the (determined) spread code, and by filtering the spread demodulated data signal (using adapted filter coefficients).

Similarly, the channel allocation of the payload data may be determined for, e.g., an LTE receive signal using pilot data contained in the receive signal 101. The allocated payload data may then be demodulated and used for generating the first compensation signal 111 by the first compensation circuit 110.

Also for other signal types (e.g. WLAN, wireline), the channel allocation of the payload data may be determined, the allocated payload data may then be demodulated and used for generating the first compensation signal 111.

The second compensation circuit 120, however, does not need to determine any channel allocation of the broadcast data or a modulation scheme used for the at least one broadcast channel since this is known from the a-priori knowledge of the at least one broadcast channel. In other words, the a-priori knowledge of the at least one broadcast channel comprises information on one or more channel parameters (e.g. used spread code, used modulation scheme) of the at least one broadcast channel. Accordingly, no complex and power consuming algorithms for blind detection of theses parameters need to be executed by the second compensation circuit 120.

If at least the channel parameters of the at least one broadcast channel are a-priori known, the symbols in the receive signal which represent the broadcast data may be detected in a facilitated manner. Channels for which the channel parameters are known may be, e.g., the Common Pilot Channel, CPICH, the Synchronization Channel, SCH, or the Primary Common Control Physical Channel, PCCPCH, for HSDPA. For LTE, a channel for which the channel parameters are known may be, e.g., the Physical Broadcast Channel, PBCH. Similarly, for various other signal types pilot and synchronization (broadcast) channels exist for which the channel parameters are known. Accordingly, interference caused by these broadcast channels may be cancelled from the receive signal 101 with reduced power consumption by the second compensation circuit 120.

The a-priori knowledge of the at least one broadcast channel may, in some examples, further comprise information on the broadcast data carried by the at least one broadcast channel. For some broadcast channels (like the CPICH), not only the channel parameters are known but also the broadcast data carried by this channel are known. Accordingly, the second compensation circuit 120 may generate the second compensation signal 121 based on only the a-priori knowledge of the at least one broadcast channel carrying the broadcast data. That is, no information needs to be derived from the receive signal 101 for generating the second compensation signal 121. Accordingly, interference caused by such broadcast channels may be cancelled from the receive signal 101 with reduced power consumption by the second compensation circuit 120.

Generally speaking, some examples relate to a means for reducing an interference component in a receive signal, wherein the interference component is caused by a first interferer emitting payload data and a second interferer emitting only broadcast data for communication control. The means comprises a means for generating a first compensation signal based on a component of the receive signal received from the first interferer. Further, the means comprises a means for generating a second compensation signal based on only a-priori knowledge of at least one broadcast channel carrying the broadcast data, or based on a detection of symbols in the receive signal which represent the broadcast data. The detection of symbols is based on only the a-priori knowledge of the at least one broadcast channel. Further, the means comprises a means for combining the first receive signal, the first compensation signal and the second compensation signal.

In some examples, the means for generating a second compensation signal may be configured to generate the second compensation signal without determining, from the receive signal, a modulation scheme used for the at least one broadcast channel.

The means for reducing an interference component may be implemented by a receiver for reducing an interference component described above or below (e.g. FIG. 1). The means for generating a first compensation signal may be implemented by a first compensation circuit described above or below (e.g. FIG. 1). The means for generating a second compensation signal may be implemented by a second compensation circuit described above or below (e.g. FIG. 1). The means for combining may be implemented by a combination circuit described above or below (e.g. FIG. 1).

Figure 2:
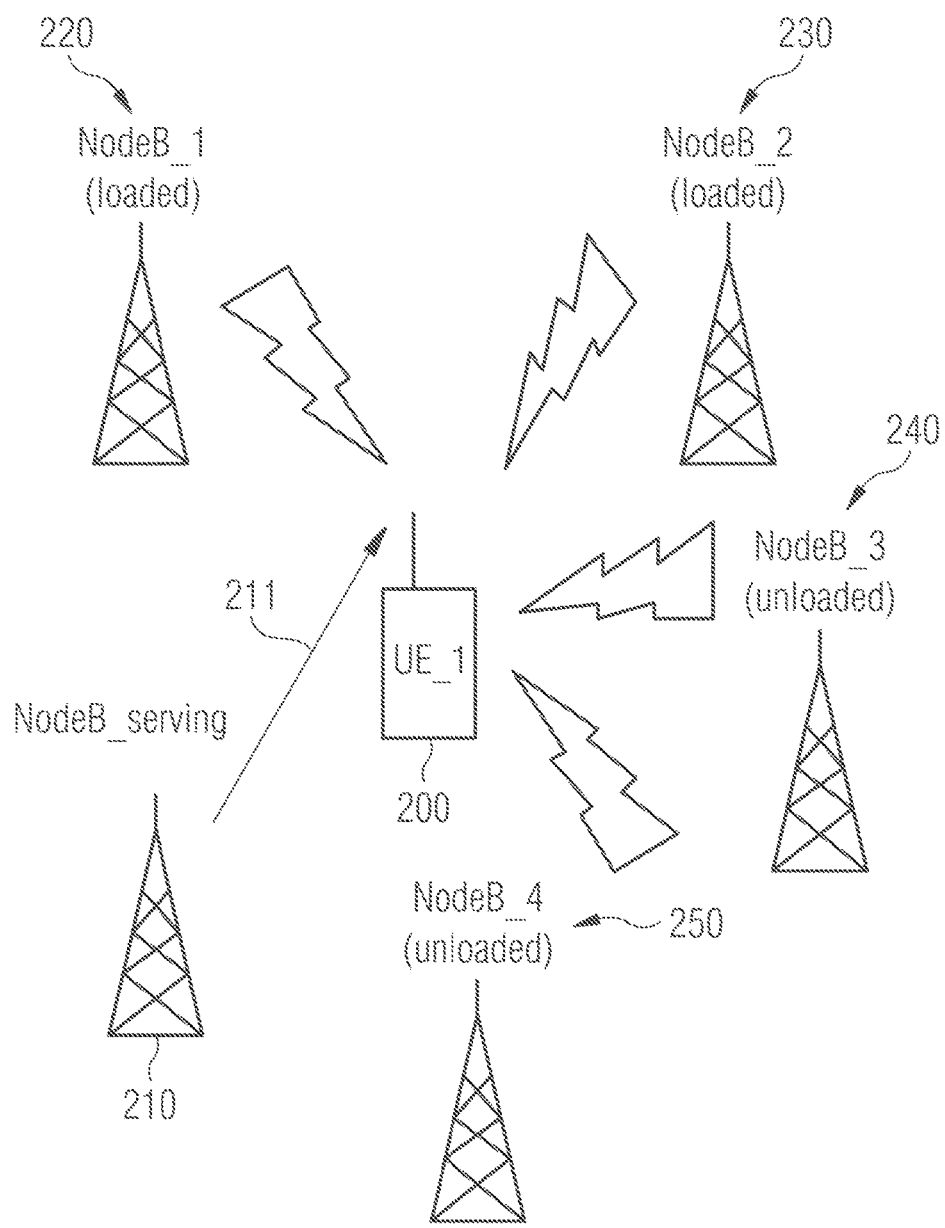
FIG. 2 illustrates an exemplary receive situation with multiple interferers.

An exemplary application of the proposed concept is illustrated in FIG. 2 which illustrates a receive situation with multiple interferers 220, 230, 240, 250. A mobile device (user equipment) 200 receives a data signal 211 from a serving NodeB 210. Simultaneously, the mobile device 200 also sees interference from the four neighboring NodeBs 220, 230, 240, 250. The two neighboring NodeBs 220 and 230 carry data signals, i.e., payload data. The two neighboring NodeBs 240 and 250 are unloaded, i.e., they transmit only broadcast data (broadcast channels) for communication control but no payload data.

A conventional receiver in the mobile device 200 which supports deterministic interference cancellation would have 4 full-fledged detection units. Two of them would actually be needed to identify the payload data signals on the loaded cells served by the NodeBs 220 and 230. However, two of the neighboring NodeBs can be handled already if only their broadcast signal (e.g. the CPICH) was cancelled.

Figure 3:
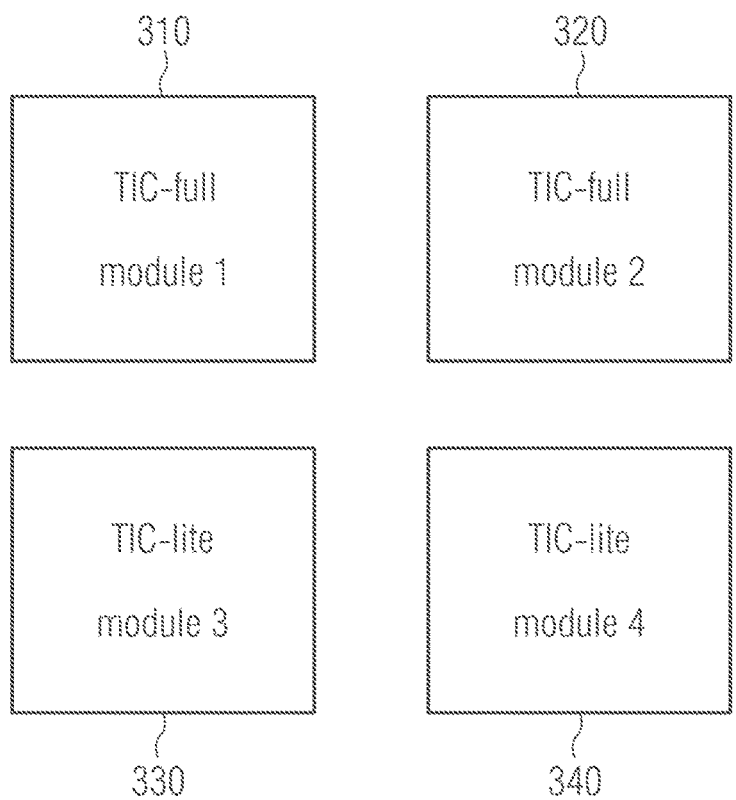
FIG. 3 illustrates an example of a configuration comprising multiple compensation circuits.

This is taken into account by the receiver 300 illustrated in FIG. 3. The receiver 300 comprises four compensation circuits 310, 320, 330 and 340. However, only the two compensation circuits 310, 320 generate a respective compensation signal which is based on a component of the receive signal received from the neighboring NodeB 220 or 230, respectively. The other two compensation circuits 330, 340 generate a respective compensation signal based on only a-priori knowledge of the one or more broadcast channels carrying the broadcast data of the neighboring NodeBs 240 and 250, or based on a detection of symbols in the receive signal which represent the broadcast data of the neighboring NodeBs 240 and 250. The detection of symbols is based on only the a-priori knowledge of the at least one broadcast channel carrying the broadcast data of the neighboring NodeBs 240 and 250. For example, if the neighboring NodeBs 240 and 250 only broadcast on the CPICH, the compensation circuits 330, 340 generate a respective compensation signal based on only a-priori knowledge of the CPICH since the channel parameters as well as the broadcast data on this channel are known.

In this way, a much "lighter" architecture can be accomplished which reduces die-size and power-consumption drastically.

In other words, instead of having N full-fledged deterministic interference cancellation units it may be sufficient to have only M of them and implement N-M units as "lite" versions. This may have the advantage that die-size (cost), power and firmware complexity can be saved whereas performance stays at its best. The available full-fledged deterministic interference cancellation units and lite modules may be assigned dynamically to the interferers as they are needed.

Figure 4:
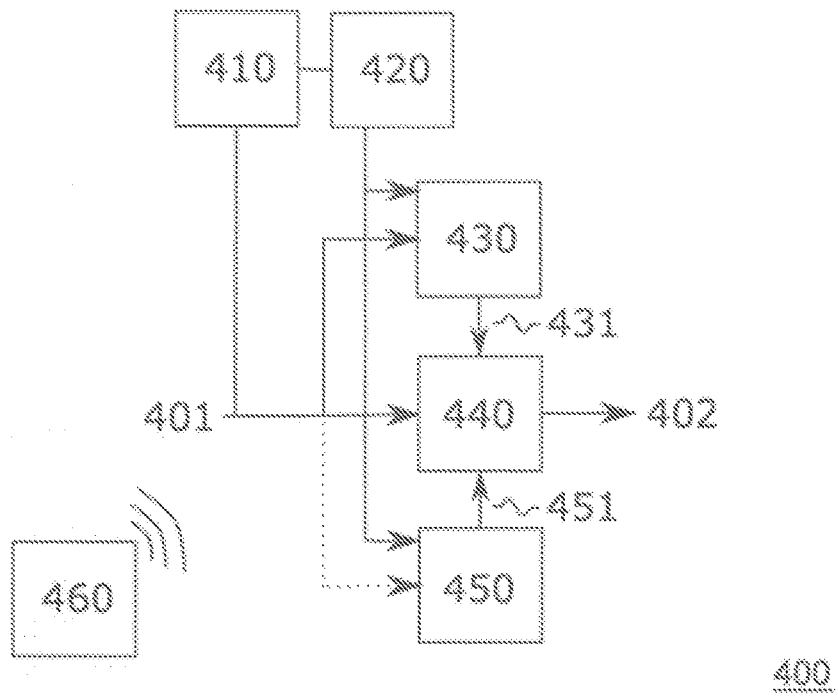
FIG. 4 illustrates another example of a receiver for reducing an interference component in a receive signal.

The assignment of compensation circuits is further illustrated in FIG. 4 which illustrates a receiver 400 for reducing an interference component in a receive signal 401. The interference component is caused by an interferer 460 emitting payload data and/or broadcast data for communication control.

The receiver 400 comprises an estimation circuit 410 configured to determine a composition of the receive signal 401. Further, the receiver 400 comprises a decision circuit 420 configured to select, based on the composition, a first compensation circuit 430 or a second compensation circuit 450 for supplying a compensation signal 431, 451 to a combination circuit 440 which combines the receive signal 401 and the compensation signal 431, 451 into the compensated receive signal 402. The first compensation circuit 430 is configured to generate the compensation signal 431 based on a component of the receive signal 401 which is received from the interferer 460. The second compensation circuit 450 is configured to generate the compensation signal 451 based on only a-priori knowledge of at least one broadcast channel carrying the broadcast data, or based on a detection of symbols in the receive signal 401 which represent the broadcast data. In this respect, the detection of symbols is based on only the a-priori knowledge of the at least one broadcast channel.

The receiver 400 may allow to select the most suitable of the first compensation circuit 430 and the second compensation circuit 450 for generating the compensation signal. The composition of the receive signal 401 may indicate if the interferer 460 emits payload data and/or broadcast data for communication control. Accordingly, the required compensation circuit for reducing the compensation component in the receive signal 401 may be selected. For example, if the composition of the receive signal 401 indicates that interferer 460 emits only broadcast data for communication control, it may sufficient to generate the compensation signal using the second compensation circuit 450. If the composition of the receive signal 401 indicates that interferer 460 emits payload data (and broadcast data), it may be required to generate the compensation signal using the first compensation circuit 430.

The decision circuit 410 may, e.g., be configured to determine the composition of the receive signal 401 based on a ratio of the pilot power of the component of the receive signal to the total power of the component of the receive signal. If the pilot power (i.e. the power of one or more pilot symbols/tones) is low compared to the total power, the signal of the interferer 460 is loaded (i.e. it carries payload data). If the pilot power (i.e. the power of one or more pilot symbols/tones) is high compared to the total power, the signal of the interferer 460 is unloaded (i.e. it carries mostly or only broadcast data for communication control). Accordingly, the decision circuit 420 may be configured to select the second compensation circuit 450 if the ratio is above a threshold value. On the contrary, the decision circuit 420 may be configured to select the first compensation circuit 430 if the ratio is below the threshold value. The threshold value may, e.g., be based on signal measurements and/or calculations.

Alternatively, the decision circuit 410 may be configured to determine the composition of the receive signal 401 based on a number of downlink channels in the receive signal 401 which are allocated to the interferer 460. The number of downlink channels allocated to the interferer 460 may be higher if the signal of the interferer 460 is loaded (i.e. it carries payload data). The number of downlink channels allocated to the interferer 460 may be lower if the signal of the interferer 460 is unloaded (i.e. it carries mostly or only broadcast data for communication control). Accordingly, the decision circuit 420 may be configured to select the second compensation circuit 450 if the number of downlink channels is below a threshold value. On the contrary, the decision circuit 420 may be configured to select the first compensation circuit 430 if the number of downlink channels is above the threshold value. The threshold value may, e.g., be based on signal measurements and/or calculations.

The estimation of the interferer 460's configuration, i.e., the determination of the receive signal 401's composition, may be done dynamically. That is, the estimation may be carried out repeatedly. For example, the composition estimation circuit 410 may be configured to redetermine the composition of the receive signal 401, wherein the decision circuit 420 may be configured to select the first compensation circuit 430 or the second compensation circuit 450 for supplying the compensation signal 431, 451 to the combination circuit 440 based on the redetermined composition. Accordingly, the first compensation circuit 430 or the second compensation circuit 450 may be assigned according to the actual needs/requirements.

Generally speaking, some examples relate to a means for reducing an interference component in a receive signal, wherein the interference component is caused by an interferer emitting payload data and/or broadcast data for communication control. The means comprises a means for determining a composition of the receive signal. Further, the means comprises a means for selecting, based on the composition, a first means or a second means for supplying a compensation signal to a means for combining the receive signal and the compensation signal. The first means for supplying a compensation signal is configured to generate the compensation signal based on a component of the receive signal received from the interferer. The second means for supplying a compensation signal is configured to generate the compensation signal based on only a-priori knowledge of at least one broadcast channel carrying the broadcast data, or based on a detection of symbols in the receive signal which represent the broadcast data, wherein the detection of symbols is based on only the a-priori knowledge of the at least one broadcast channel.

The means for reducing an interference component may be implemented by a receiver for reducing an interference component described above or below (e.g. FIG. 4). The means for determining a composition of the receive signal may be implemented by an estimation circuit described above or below (e.g. FIG. 4). The means for selecting may be implemented by a decision circuit described above or below (e.g. FIG. 4). The first means for supplying a compensation signal may be implemented by a first compensation circuit described above or below (e.g. FIG. 4). The second means for supplying a compensation signal may be implemented by a second compensation circuit described above or below (e.g. FIG. 4). The means for combining may be implemented by a combination circuit described above or below (e.g. FIG. 4).

In some examples, full deterministic interference cancellation may be implemented not for N-interferers. Full deterministic interference cancellation may only be done for M out of N interferers. The other N-M interferers may support a lite deterministic interference cancellation but not full deterministic interference cancellation. Lite deterministic interference cancellation considers only the broadcast channels (e.g. pilot and synchronization channels). Hence, a very tradeoff between throughput performance and cost may be achieved.

The proposed concept may hit three essential Key Performance Indicators (KPIs) that are important to cellular systems. By adding lite deterministic interference cancellation elements into the receiver, the user-experience may be improved by obtaining higher datarates. Instead of having a full-fledged deterministic interference cancellation structure additional lite deterministic interference cancellation may cause practically no increase in die-size. Further, since full-code searches, modulation detection, and power-estimates need not be obtained, the power-consumption may be reduced greatly. Also firmware complexity may be reduced. Since only pre-known broadcast channels (e.g. pilot, synchronization) are cancelled, complex algorithms for the detection of data signal allocation and symbol detection may be not required.

Figure 5:
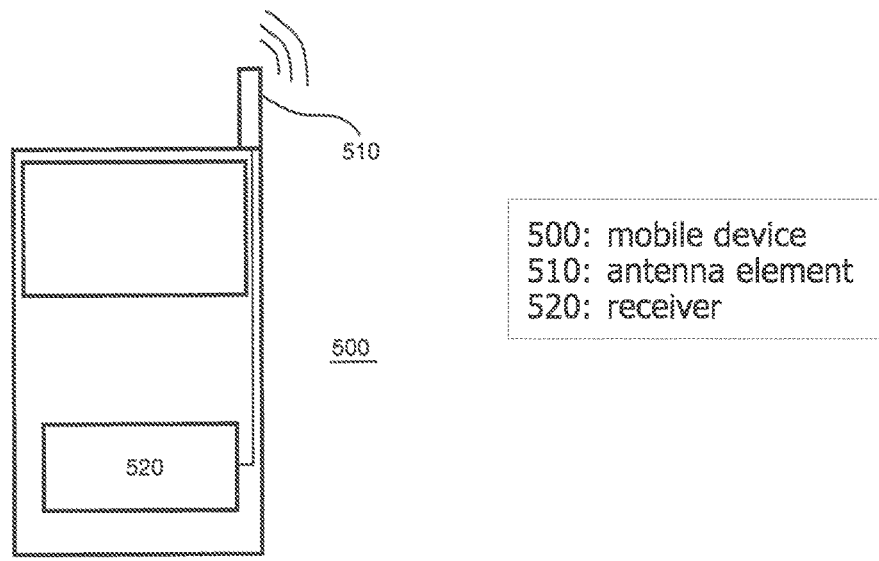
FIG. 5 illustrates an example of a mobile device comprising a receiver.

An example of an implementation using a receiver according to one or more aspects of the proposed concept or one or more examples described above is illustrated in FIG. 5. FIG. 5 schematically illustrates an example of a mobile device 500 (e.g. mobile phone, smartphone, tablet-computer, or laptop) comprising a receiver 520 according to an example described herein. An antenna element 510 of the mobile device 500 may be coupled to the receiver 520. To this end, mobile devices may be provided with improved user experience as well as reduced power consumption.

Figure 6:
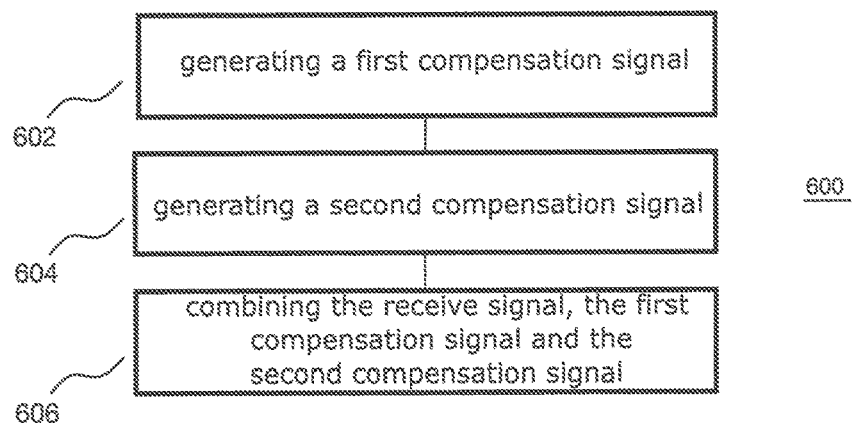
FIG. 6 illustrates a flowchart of an example of a method for reducing an interference component in a receive signal.

An example of a method 600 method for reducing an interference component in a receive signal is illustrated by means of a flowchart in FIG. 6. The interference component is caused by a first interferer emitting payload data and a second interferer emitting only broadcast data for communication control. The method 600 comprises generating 602 a first compensation signal based on a component of the receive signal received from the first interferer. Further, the method 600 comprises generating 604 a second compensation signal based on only a-priori knowledge of at least one broadcast channel carrying the broadcast data, or based on a detection of symbols in the receive signal which represent the broadcast data. In this respect, the detection of symbols is based on only the a-priori knowledge of the at least one broadcast channel. The method 600 also comprises combining 606 the receive signal, the first compensation signal and the second compensation signal.

More details and aspects of the method are mentioned in connection with the proposed concept or one or more examples described above (e.g. FIGS. 1 to 3). The method may comprise one or more additional optional features corresponding to one or more aspects of the proposed concept or one or more examples described above.

Figure 7:
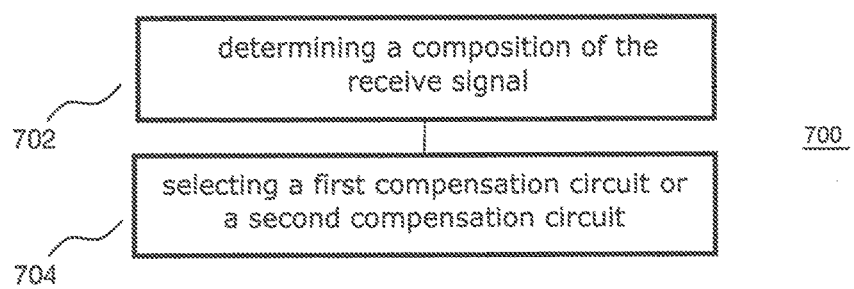
FIG. 7 illustrates a flowchart of another example of a method for reducing an interference component in a receive signal.

An example of another method 700 for reducing an interference component in a receive signal is illustrated by means of a flowchart in FIG. 7. The interference component is caused by an interferer emitting payload data and/or broadcast data for communication control. The method 700 comprises determining 702 a composition of the receive signal. Further, the method 700 comprises selecting 704, based on the composition, a first compensation circuit or a second compensation circuit for supplying a compensation signal to combination circuit which combines the receive signal and the compensation signal. In this respect, the first compensation circuit is configured to generate the compensation signal based on a component of the receive signal received from the interferer. The second compensation circuit is configured to generate the compensation signal based on only a-priori knowledge of at least one broadcast channel carrying the broadcast data, or based on a detection of symbols in the receive signal which represent the broadcast data. The detection of symbols is based on only the a-priori knowledge of the at least one broadcast channel.

More details and aspects of the method are mentioned in connection with the proposed concept or one or more examples described above (e.g. FIG. 4). The method may comprise one or more additional optional features corresponding to one or more aspects of the proposed concept or one or more examples described above.

The examples as described herein may be summarized as follows:

Example 1 is a receiver for reducing an interference component in a receive signal, wherein the interference component is caused by a first interferer emitting payload data and a second interferer emitting only broadcast data for communication control, the receiver comprising: a first compensation circuit configured to generate a first compensation signal based on a component of the receive signal received from the first interferer; a second compensation circuit configured to generate a second compensation signal based on only a-priori knowledge of at least one broadcast channel carrying the broadcast data, or based on a detection of symbols in the receive signal which represent the broadcast data, wherein the detection of symbols is based on only the a-priori knowledge of the at least one broadcast channel; and a combination circuit configured to combine the receive signal, the first compensation signal and the second compensation signal.

In example 2, the first compensation circuit in the receiver of example 1 is further configured to: determine, based on the receive signal, at least one downlink channel carrying the payload data; generate, based on the receive signal, a demodulated data signal comprising the payload data of the downlink channel; and generate the first compensation signal based on the demodulated data signal.

In example 3, the a-priori knowledge of the at least one broadcast channel in the receiver of example 1 or example 2 comprises information on one or more channel parameters of the at least one broadcast channel.

In example 4, the a-priori knowledge of the at least one broadcast channel in the receiver of example 3 further comprises information on the broadcast data carried by the at least one broadcast channel.

In example 5, the second compensation circuit in the receiver of any of the preceding examples is configured to generate the second compensation signal without determining, from the receive signal, a modulation scheme used for the at least one broadcast channel.

Example 6 is a receiver for reducing an interference component in a receive signal, wherein the interference component is caused by an interferer emitting payload data and/or broadcast data for communication control, the receiver comprising: an estimation circuit configured to determine a composition of the receive signal; and a decision circuit configured to select, based on the composition, a first compensation circuit or a second compensation circuit for supplying a compensation signal to a combination circuit which combines the receive signal and the compensation signal, wherein the first compensation circuit is configured to generate the compensation signal based on a component of the receive signal received from the interferer, and wherein the second compensation circuit is configured to generate the compensation signal based on only a-priori knowledge of at least one broadcast channel carrying the broadcast data, or based on a detection of symbols in the receive signal which represent the broadcast data, wherein the detection of symbols is based on only the a-priori knowledge of the at least one broadcast channel.

In example 7, the decision circuit in the receiver of example 6 is configured to determine the composition of the receive signal based on a ratio of the pilot power of the component of the receive signal to the total power of the component of the receive signal.

In example 8, the decision circuit in the receiver of example 7 is configured to select the second compensation circuit if the ratio is above a threshold value.

In example 9, the decision circuit in the receiver of example 6 is configured to determine the composition of the receive signal based on a number of downlink channels in the receive signal which are allocated to the interferer.

In example 10, the decision circuit in the receiver of example 9 is configured to select the second compensation circuit if the number of downlink channels is below a threshold value.

In example 11, the composition estimation circuit in the receiver of any of examples 6 to 10 is configured to redetermine the composition of the receive signal, wherein the decision circuit is configured to select the first compensation circuit or the second compensation circuit for supplying the compensation signal to the combination circuit based on the redetermined composition.

Example 12 is a mobile device comprising a receiver according to any of examples 1 to 5, or a receiver according to any of examples 6 to 11.

In example 13, the mobile device of example 12 further comprises at least one antenna element coupled to the receiver.

Example 14 is a method for reducing an interference component in a receive signal, wherein the interference component is caused by a first interferer emitting payload data and a second interferer emitting only broadcast data for communication control, the method comprising: generating a first compensation signal based on a component of the receive signal received from the first interferer; generating a second compensation signal based on only a-priori knowledge of at least one broadcast channel carrying the broadcast data, or based on a detection of symbols in the receive signal which represent the broadcast data, wherein the detection of symbols is based on only the a-priori knowledge of the at least one broadcast channel; and combining the receive signal, the first compensation signal and the second compensation signal.

In example 15, generating the first compensation signal in the method of example 14 comprises: determining, based on the second signal, at least one downlink channel carrying the payload data; generating, based on the second signal, a demodulated data signal comprising the payload data of the downlink channel; and generating the first compensation signal based on the demodulated data signal.

In example 16, the a-priori knowledge of the at least one broadcast channel in the method of example 14 or example 15 comprises information on one or more channel parameters of the at least one broadcast channel.

In example 17, the a-priori knowledge of the at least one broadcast channel in the method of example 16 further comprises information on the broadcast data carried by the at least one broadcast channel.

In example 18, the second compensation signal in the method of any of the preceding examples is generated without determining, from the receive signal, a modulation scheme used for the at least one broadcast channel.

Example 19 is a method for reducing an interference component in a receive signal, wherein the interference component is caused by an interferer emitting payload data and/or broadcast data for communication control, the method comprising: determining a composition of the receive signal; and selecting, based on the composition, a first compensation circuit or a second compensation circuit for supplying a compensation signal to combination circuit which combines the receive signal and the compensation signal, wherein the first compensation circuit is configured to generate the compensation signal based on a component of the receive signal received from the interferer, and wherein the second compensation circuit is configured to generate the compensation signal based on only a-priori knowledge of at least one broadcast channel carrying the broadcast data, or based on a detection of symbols in the receive signal which represent the broadcast data, wherein the detection of symbols is based on only the a-priori knowledge of the at least one broadcast channel.

In example 20, determining the composition of the receive signal in the method of example 19 is based on a ratio of the pilot power of the component of the receive signal to the total power of the component of the receive signal.

In example 21, selecting the first compensation circuit or the second compensation circuit in the method of example 20 comprises selecting the second compensation circuit if the ratio is above a threshold value.

In example 22, determining the composition of the receive signal in the method of example 19 is based on a number of downlink channels in the receive signal which are allocated to the interferer.

In example 23, selecting the first compensation circuit or the second compensation circuit in the method of example 22 comprises selecting the second compensation circuit if the number of downlink channels is below a threshold value.

In example 24, the method of any of examples 19 to 23 further comprises: redetermining the composition of the receive signal; and selecting the first compensation circuit or the second compensation circuit for supplying the compensation signal to the combination circuit based on the redetermined composition.

Example 25 is a computer readable storage medium having stored thereon a program having a program code for performing the method of any of examples 14 to 18, or the method of any of examples 19 to 24, when the program is executed on a computer or processor.

Example 26 is a computer program having a program code configured to perform the method of any of examples 14 to 18, or the method of any of examples 19 to 24, when the computer program is executed on a computer or processor.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computerexecutable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A receiver for reducing an interference component in a receive signal, wherein the interference component is caused by a first interferer emitting payload data and a second interferer emitting only broadcast data for communication control, the receiver comprising:
    a first compensation circuit configured to generate a first compensation signal based on a component of the receive signal received from the first interferer;
    a second compensation circuit configured to generate a second compensation signal based on only a-priori knowledge of at least one broadcast channel carrying the broadcast data, or based on a detection of symbols in the receive signal which represent the broadcast data, wherein the detection of symbols is based on only the a-priori knowledge of the at least one broadcast channel, and
    a combination circuit configured to combine the receive signal, the first compensation signal and the second compensation signal.

2. The receiver of claim 1, wherein the first compensation circuit is further configured to:
    determine, based on the receive signal, at least one downlink channel carrying the payload data;
    generate, based on the receive signal, a demodulated data signal comprising the payload data of the downlink channel; and
    generate the first compensation signal based on the demodulated data signal.

3. The receiver of claim 1, wherein the a-priori knowledge of the at least one broadcast channel comprises information on one or more channel parameters of the at least one broadcast channel.

4. The receiver of claim 3, wherein the a-priori knowledge of the at least one broadcast channel further comprises information on the broadcast data carried by the at least one broadcast channel.

5. The receiver of claim 1, wherein the second compensation circuit is configured to generate the second compensation signal without determining, from the receive signal, a modulation scheme used for the at least one broadcast channel.

6. A receiver for reducing an interference component in a receive signal, wherein the interference component is caused by an interferer emitting payload data and/or broadcast data for communication control, the receiver comprising:
   an estimation circuit configured to determine a composition of the receive signal; and
   a decision circuit configured to select, based on the composition, a first compensation circuit or a second compensation circuit for supplying a compensation signal to a combination circuit which combines the receive signal and the compensation signal,
   wherein the first compensation circuit is configured to generate the compensation signal based on a component of the receive signal received from the interferer, and
   wherein the second compensation circuit is configured to generate the compensation signal based on only a-priori knowledge of at least one broadcast channel carrying the broadcast data, or based on a detection of symbols in the receive signal which represent the broadcast data, wherein the detection of symbols is based on only the a-priori knowledge of the at least one broadcast channel.

7. The receiver of claim 6, wherein the decision circuit is configured to determine the composition of the receive signal based on a ratio of the pilot power of the component of the receive signal to the total power of the component of the receive signal.

8. The receiver of claim 7, wherein the decision circuit is configured to select the second compensation circuit if the ratio is above a threshold value.

9. The receiver of claim 6, wherein the decision circuit is configured to determine the composition of the receive signal based on a number of downlink channels in the receive signal which are allocated to the interferer.

10. The receiver of claim 9, wherein the decision circuit is configured to select the second compensation circuit if the number of downlink channels is below a threshold value.

11. The receiver of claim 6, wherein the composition estimation circuit is configured to redetermine the composition of the receive signal, and wherein the decision circuit is configured to select the first compensation circuit or the second compensation circuit for supplying the compensation signal to the combination circuit based on the redetermined composition.

12. A method for reducing an interference component in a receive signal, wherein the interference component is caused by a first interferer emitting payload data and a second interferer emitting only broadcast data for communication control, the method comprising:
   generating a first compensation signal based on a component of the receive signal received from the first interferer;
   generating a second compensation signal based on only a-priori knowledge of at least one broadcast channel carrying the broadcast data, or based on a detection of symbols in the receive signal which represent the broadcast data, wherein the detection of symbols is based on only the a-priori knowledge of the at least one broadcast channel; and
   combining the receive signal, the first compensation signal and the second compensation signal.

13. The method of claim 12, wherein generating the first compensation signal comprises:
   determining, based on the second signal, at least one downlink channel carrying the payload data;
   generating, based on the second signal, a demodulated data signal comprising the payload data of the downlink channel; and
   generating the first compensation signal based on the demodulated data signal.

14. The method of claim 12, wherein the a-priori knowledge of the at least one broadcast channel comprises information on one or more channel parameters of the at least one broadcast channel.

15. The method of claim 14, wherein the a-priori knowledge of the at least one broadcast channel further comprises information on the broadcast data carried by the at least one broadcast channel.

16. The method of claim 12, wherein the second compensation signal is generated without determining, from the receive signal, a modulation scheme used for the at least one broadcast channel.

17. A method for reducing an interference component in a receive signal, wherein the interference component is caused by an interferer emitting payload data and/or broadcast data for communication control, the method comprising:
   determining a composition of the receive signal; and
   selecting, based on the composition, a first compensation circuit or a second compensation circuit for supplying a compensation signal to combination circuit which combines the receive signal and the compensation signal,
   wherein the first compensation circuit is configured to generate the compensation signal based on a component of the receive signal received from the interferer, and
   wherein the second compensation circuit is configured to generate the compensation signal based on only a-priori knowledge of at least one broadcast channel carrying the broadcast data, or based on a detection of symbols in the receive signal which represent the broadcast data, wherein the detection of symbols is based on only the a-priori knowledge of the at least one broadcast channel.

18. The method of claim 17, wherein determining the composition of the receive signal is based on a ratio of the pilot power of the component of the receive signal to the total power of the component of the receive signal.

19. The method of claim 18, wherein selecting the first compensation circuit or the second compensation circuit comprises selecting the second compensation circuit if the ratio is above a threshold value.

20. The method of claim 17, wherein determining the composition of the receive signal is based on a number of downlink channels in the receive signal which are allocated to the interferer.

21. The method of claim 20, wherein selecting the first compensation circuit or the second compensation circuit comprises selecting the second compensation circuit if the number of downlink channels is below a threshold value.

22. The method of claim 17, wherein the method further comprises:
   redetermining the composition of the receive signal; and
   selecting the first compensation circuit or the second compensation circuit for supplying the compensation signal to the combination circuit based on the redetermined composition.

* * * * *